Feb. 10, 1959 — S. GRAY — 2,873,397

COLOR FILTERS

Filed March 24, 1955 — 2 Sheets-Sheet 1

INVENTOR.
Sidney Gray
BY William A. Balcsak
ATTORNEY

INVENTOR.
Sidney Gray

United States Patent Office 2,873,397
Patented Feb. 10, 1959

2,873,397

COLOR FILTERS

Sidney Gray, Somerville, N. J., assignor to Radio Corporation of America, a corporation of Delaware Application March 24, 1955, Serial No. 496,478

5 Claims. (Cl. 313—65)

This invention relates to color television pickup, or camera tubes, and particularly to an improved target for such tubes.

In the past various types of pickup tubes have been proposed for producing color television pictures with a single tube. Heretofore, one such type of tube has included, within an evacuated envelope, an electron gun which directs a beam of electrons against a target electrode. In this type of tube the target electrode comprises a large number of color filter strips for each of three primary colors, a separate conductive signal strip on each of the color filter strips, and a photoconductive surface over all of the signal strips. Specifically, the color analysis of the scene to be reproduced is performed in the target by alternate red, green and blue color filter strips.

The color filters presently being used in tubes of this type are dichroic filters, i. e. filters which pass a particular color principally by virtue of optical interference. This type of filter is discussed in an article entitled "Interference Filters in Optics" by K. M. Greenland in the July 1952 issue of Endeavour, page 143. These color filters are normally formed by depositing, upon a transparent substrata, substances of alternate high and low indices of refraction of the prescribed optical thicknesses. A fraction of the light of a particular color incident on each interface of such a filter is reflected and the amplitudes and phases of all such reflections combined in one spectral region so as to interfere constructively, i. e. interfere in phase, and produce high reflectivity along with low transmission for that particular color; in neighboring spectral regions the phasing and amplitudes are such that the reflections combine so as to interfere destructively, i. e. interfere out of phase, for the particular color, so that a net reflectivity is small and transmission is high for the given color.

A typical dichloric filter for blue light includes an odd number of layers, e. g. nine, of alternate zinc sulphide and cryolite. The zinc sulphide which is a high index of refraction material, is deposited as the first, i. e. on the glass substrata, and last layers of the color filter while the cryolite, which possesses a low index of refraction, is used for the even numbered layers. For a blue color filter, the layers of material are optically one-quarter wave length thick for green light. The width of the reflection band is sufficient to reflect strongly both green and red light while blue light is transmitted by the filter.

Multi layer filters of the type briefly described above have, prior to this invention, utilized a last layer comprising a material having a high index of refraction. The design of the particular type of pickup tube briefly referred to above requires the superposition of a semi-transparent conducting layer on each color filter to act as a signal electrode through which the photoconductor is charged and the video signal is collected. It has been found that the addition of a semi-transparent conductive strip to the high index of refraction layer of the conventional dichroic filter seriously impairs the optical efficiency of the filter, i. e. the ratio of transmissions of unwanted and wanted light. Specifically, the addition of a semi-transparent conductive strip to a conventional color filter adds two new reflections, i. e. one at the interface between the last layer of the dielectric and the conductive strip, and one at the conductive strip-atmosphere interface. These two reflections combine so that the color filter is deteriorated. For example, when a signal strip is placed on a blue transmitting filter the ratio of peak to minimum transmission is reduced by a factor of two and also the reflection band is considerably narrowed, relative to the peak blue transmission, so that the filter accepts about four times as much red light after the addition of the conductive strip.

It is therefore an object of this invention to provide an improved pickup tube which is capable of true color response.

Another object of this invention is to provide a new and improved target for a pickup tube.

These and other objects are accomplished in accordance with this invention by providing new and improved target for a pickup tube. The pickup tube comprises a sealed envelope having an electron gun in one end that produces an electron beam which scans the target within the other end of the envelope. The target comprises a transparent support member supporting a plurality of alternating color filters each of which supports a semi-transparent conductive signal strip. Covering the signal strips is a photoconductive layer. The color filters comprise alternate layers of high and low index of refraction of materials with the layer abutting the signal strip being a layer having a low index of refraction. In accordance with this invention the final layer has a low index of refraction so that the semi-transparent signal strip is optically accommodated resulting in improved characteristics of the filter.

Figure 1:
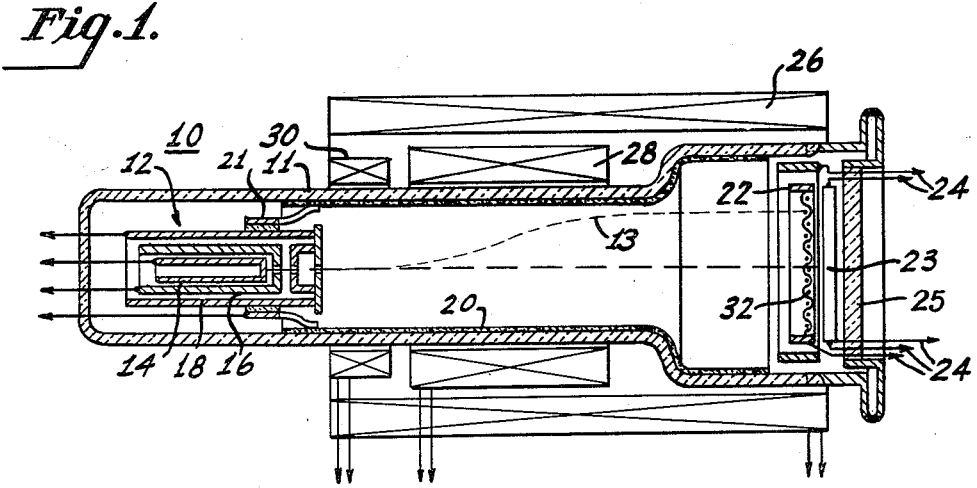
Figure 1 is a longitudinal section of a pickup tube utilizing a target in accordance with this invention.

For purposes of illustrating this invention it is described in connection with the photoconductive pickup tube shown in Figure 1. However, it should be clearly understood that this invention is equally applicable to other devices wherein it is desirable to utilize color filters, e. g. other types of tubes, and particularly to other types of pickup tubes suitable for color television transmission.

Pickup tube 10 comprises an evacuated envelope 11 having an electron gun 12 mounted in one end thereof. As is well known electron gun 12 includes a cathode 14, control electrode 16 and one or more accelerating and focusing electrodes 18. A final accelerating electrode 20 is in the form of a conductive coating on the inside of envelope 11 as shown. Electrical contact to the accelerating electrode 20 is made by means including spring fingers 21 mounted on the electron gun 12 and insulated therefrom. A target 23, which is scanned by an electron beam 13 generated by the electron gun 12, is mounted adjacent to the opposite end of envelope 11. The target 23 may be supported on the inner surface of the face plate 25, or in the alternative a separate support member may be utilized. In any case, the target 23 is mounted so that object light passing through the end of envelope 11 is readily directed thereupon. Lead-ins 24, sealed through the envelope, make electrical connections with, and support the target 23.

Means are provided for scanning the electron beam 13 over the surface of target 23 and may include the usual focus coil 26, deflection yoke 28, and alignment coil 30. To ensure that the electron beam, during its final approach to the surface of the target 23 is normal thereto a fine mesh screen 32, which is permeable to the electron beam, is mounted adjacent to the target 23. One of the lead-ins 24 is provided for making electrical connection with a ring 22 that supports, and is in electrical contact with the mesh screen 32.

Figure 2:
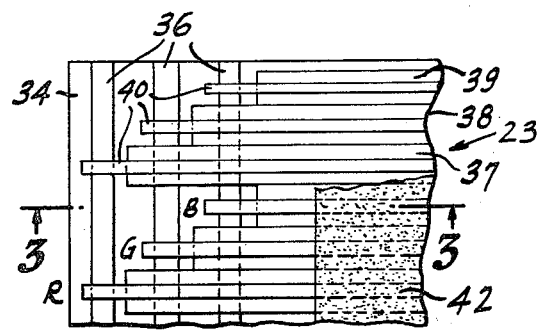
Figure 2 is an enlarged fragmentary view of the target shown in Figure 1.
Figure 4:
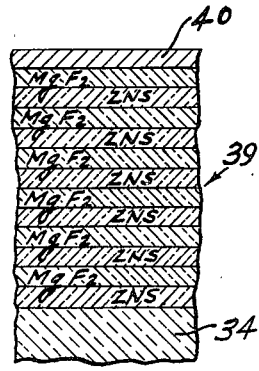
Figure 4 is a greatly enlarged fragmentary sectional view of a blue color filter in accordance with this invention.
Figure 3:
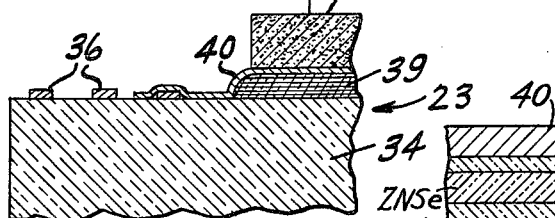
Figure 3 is a fragmentary sectional view of the target shown in Figure 2.

Target 23, which is shown in detail in Figures 2 and 3, includes means for supporting the various color filters and other elements. The means may be a transparent support sheet 34, such as glass, having a plurality of spaced conductors, or bus bars 36 formed thereon. A set of bus bars 36, one set including one bus bar for each of three primary colors, is arranged adjacent to an end of support sheet 34. An additional set of bus bars (not shown) may be arranged adjacent to the opposite end of support sheet 34 to provide double ended connections. Extending across the support sheet 34 are color filters 37, 38 and 39 forming a cluster for three selected primary colors such as red, green and blue. There is a large plurality of such clusters of color filters disposed upon the support sheet 34. The particular color filters, which will be explained in greater detail in connection with Figure 4, are normally electrically insulating.

Partially covering each of the color filters 37, 38 and 39 is a different semi-transparent conductive strip 40, each of which is somewhat longer than its associated color filter strip 37, 38 or 39, to extend over and make electrical contact with a respective bus bar 36. In other words, a red color filter strip 37 extends over the blue and green bus bars 36 to insulate the red signal strip 40 therefrom. Similarly a green color filter strip 38 extends over the blue bus bars 36 to form similar insulation between each green signal strip 40 and blue bus bar 36. Photoconductive material 42, in the form of a coating, is applied over the transparent conductive strips 40. In a photoconductive pickup tube such as tube 10, the photoconductive material may be porous antimony tri-sulphide which has a broad spectral response similar to that of the human eye. Other photoconductive materials may also be utilized.

In accordance with this invention the color filters 38 and 39 i. e. for the green and blue colors, optically accommodate a semi-transparent signal strip 40 by terminating in a material which has a low index of refraction. In other words, the filter is prepared in such a way that the addition of a semi-transparent signal strip not only does not deteriorate the transmission characteristics of the filter but may actually improve it. For example, a color filter 39, shown in more detail in Figure 4, for blue light will now have an even number, i. e. twelve, of layers of alternate zinc sulphide and magnesium fluoride, with zinc sulphide, which is a high index material, forming the first layer on the transparent support member 34, while the magnesium fluoride, which is a low index material forms the last layer of the color filter 39. Each of these layers has a thickness corresponding to an optical thickness of one quarter wave length of light approximately 5450 angstrom units in wave length.

Figure 4A:
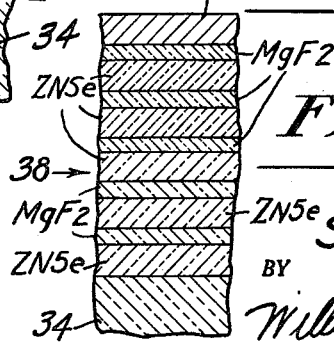
Figure 4A is a greatly enlarged sectional view of a green color filter in accordance with this invention.

A green color filter 38, shown in detail in Figure 4A, is formed of ten alternate layers of similar materials with the zinc selenide having a three quarter wave length thickness of light of approximately 6300 angstrom units in wave length, and quarter wave length layers of magnesium fluoride. In a green color filter the third layer of zinc selenide may be made one quarter wave length in thickness to provide a somewhat wider reflection band. In the case of the color filters, e. g. green color filters 38 and blue color filters 39, the terminating layer, i. e. the layer onto which the semi-transparent signal strip 40 is formed, is a material having a low index of refraction.

Figure 5:
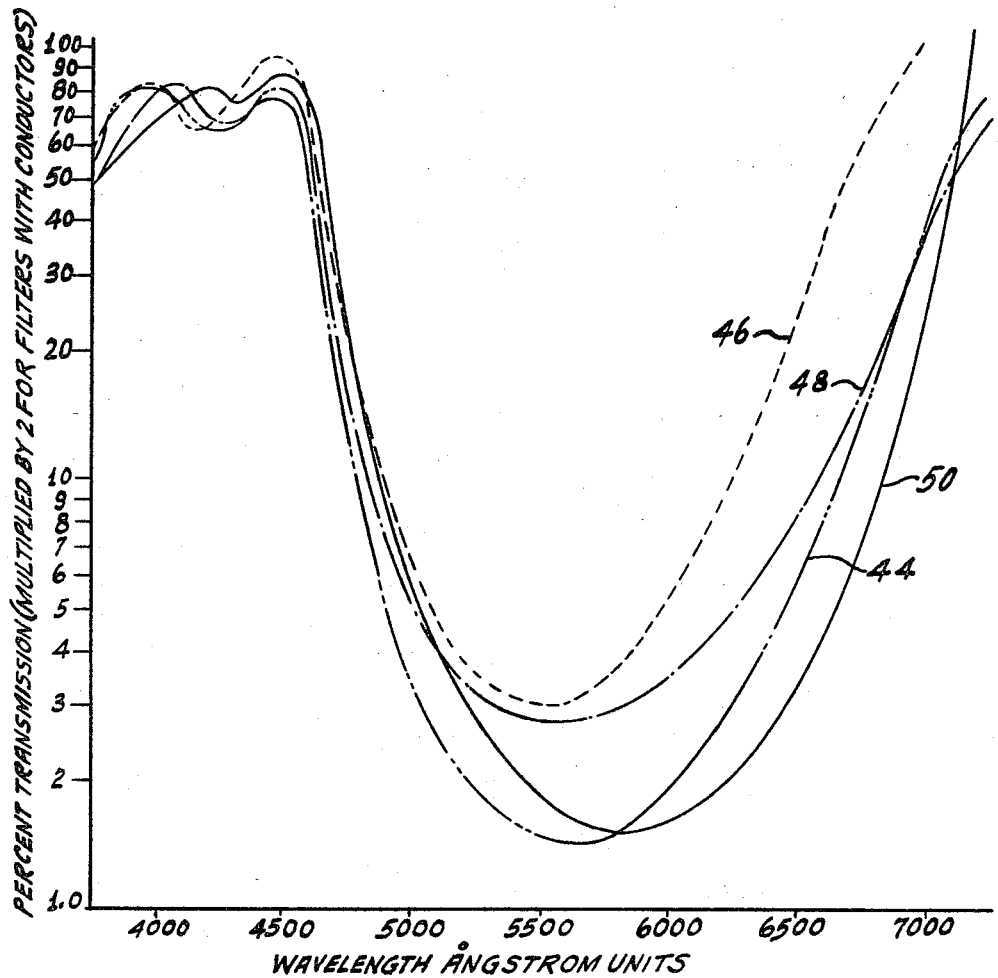
Figure 5 is a chart of the transmission efficiency of various blue transmitting color filters.

The reasons for terminating a color filter with a low index of refraction material is to optically accommodate the semi-transparent signal strip 40. The semi-transparent signal strips may be gold and may be approximately 150 angstrom units thick. Gold is utilized for the signal strips 40 because it is chemically inert with respect to change within the target and with respect to reaction with the photoconductor 42; because it may be deposited by evaporation without difficulty; and because its optical absorption is low. The optical accommodation of the signal strips is shown more clearly in Figure 5 which shows graphs of the characteristics plotted on a semi-logarithmic scale, of the percent transmission of light plotted against the wave length in angstrom units for four different blue transmitting, dichroic filters. Curve 44 is a characteristic curve for a conventional nine layer blue, dichroic filter without a semi-transparent signal strip. This type of filter has been utilized in pickup tubes of the type described prior to this invention. Curve 46 is for the same conventional nine layer blue dichroic filter as curve 44 in combination with a single semi-transparent signal strip of gold. The sensitivity of the filters having a semi-transparent signal strip thereupon, has been multiplied by two in order to compare those with and those without signal strips due to the fact that the signal strips are only semi-transparent. As shown in Figure 5 the nine layer blue transmitting dichroic filter, i. e. characteristic curve 44, has a reflection band which is centered in the green, and light is passed in the blue and far red portions of the color spectrum. Curve 46 shows how the superposition of a semi-transparent gold signal strip, which is about 50 percent transmitting, affects the filter for which characteristic 44 is drawn. As can be seen from Figure 5, the ratio of peak to minimum transmission is reduced by a factor of two due to the addition of the semi-transparent signal strip. The filter is further deteriorated in that the reflection band is considerably narrowed so that about four times as much red light is transmited by the filter, after gold has been added, relative to the peak blue transmission.

Curve 48 is a characteristic of a blue color filter, in accordance with this invention, without a semi-transparent signal strip. As can be seen from Figure 5 curve 48 has about the same reflection band width as the conventional nine layer filter but the minimum transmission in the reflection band is higher by a factor of two than that of a conventional filter, i. e. curve 44. The effect of the addition of a semi-transparent signal strip of gold to the twelve layer blue filter is shown by curve 50. This is the curve for a blue filter 39 and signal strip 40 as shown in Figure 4. The addition of the semi-transparent signal strip of gold restores the ratio of peak to minimum transmission of conventional nine layer filter, and maintains the width of the reflection band in such a way that the overall efficiency of a twelve layer filter, with signal strip, is better than that of a nine layer filter without signal strip, and better than that of a nine layer filter with signal strip by about a factor of eight. It should be understood that the invention is also applicable to green transmitting color filters. The curves for green filters are similar to those shown in Figure 5 with the response shifted.

The superposition of the semi-transparent gold signal strip introduces two new reflections at the filter boundaries, i. e. one at the gold dielectric interface and one at the gold air interface in conventional blue and green color filters. These new reflections interfere with other reflections arising in other interfaces within the filter in a desirable way when the last dielectric is a low index material, in accordance with this invention. In other words these reflections at the gold boundaries are optically accommodated with the other reflections within the filters so as to improve the characteristics of the filter.

For the red color filter 37 it has been found that it is not necessary to optically accommodate a gold signal strip due to the high reflectivity of gold in this region of the color spectrum, which tends to cooperate with other reflectivities in the conventional nine layer, dichroic filter so that the transmission in the red remains high. However, it should be understood that, when other metals are utilized for the signal strips 40 e. g. silver, or aluminum, this invention can be utilized in the red portion of the spectrum as well as the blue and green. A typical red color filter 37, with optical accommodation of its signal strip comprises successive alternate layers of high and low index of refraction material which have thickness corresponding to an optical thickness of one quarter wave length of light of approximately 4300 angstrom units of wave length. In accordance with this invention the terminating layer of material has a low index of refraction.

When silver is to be utilized as a signal strip 40 to obtain optimum light transmission the silver is preferably deposited to a thickness of approximately 200 angstrom units.

Another color filter which has been found to be improved by this invention is a cyan blue filter comprising ten alternate layers of three quarters wave length zinc sulphide and one quarter wave length magnesium fluoride for light of approximately 6300 angstrom units thick. The cyan blue filter terminates in a low index material, i. e. magnesium fluoride, to optically accommodate a gold strip.

Still another color filter in which this invention is useful, when using gold signal strips, is a magenta filter comprising 10 layers of alternate three quarter wave length of zinc sulphide and one quarter wave length of magnesium fluoride of light of approximately 5100 angstrom units wave length. The magenta color filter terminates in the low index material when using gold signal strips.

It should be understood that other color filters may also be made to optically accommodate conductive signal strips in accordance with this invention, and those described above are specific examples of successful operation.

What is claimed is:

1. A pickup tube comprising an envelope, means for producing an electron beam in one end of said envelope, a target comprising a transparent support member in the other end of said envelope, said target further including a plurality of color filter strips arranged in clusters on a surface of said support member toward said means, one of said clusters being formed by three color filter strips each of which transmits a different one of three primary colors, at least one color filter in each of said clusters comprising successive layers of alternate high and low index of refraction material, and the layer of material toward said means being a low index of refraction material, and a different transparent conductive signal strip on each of said filters and between said means and said filters.

2. A pickup tube comprising an envelope, means for producing an electron beam in one end of said envelope, a target electrode in the other end of said envelope, said target electrode including a transparent support having a plurality of color filters arranged in clusters on the surface of said support toward said means, each of said clusters being formed of a plurality of color filters each of which passes a different color of light, one of said color filters in each of said clusters comprising an even number of successive layers of alternate high and low index of refraction materials, and the layer of material nearest said means being a low index of refraction material, and a different transparent conductive signal strip on each of said filters and between said means and said filters.

3. In a pickup tube of the type including means for producing an electron beam, a target, said target comprising a transparent support member, a plurality of clusters of color filters on the surface of said support member toward said means, each color filter in one of said clusters transmitting light of a different one of three primary colors, one color filter in each of said clusters comprising a plurality of successive layers of alternate high and low index of refraction materials with the layer of material most removed from said support member being a low index of refraction material, and a transparent conductive strip disposed on said most removed layer.

4. A camera device including means for producing an electron beam, a target, said target comprising a transparent supporting member, at least one color filter on the surface of said supporting member toward said means, said color filter comprising a plurality of successive layers of alternate high and low index of refraction materials, the layer most removed from said supporting member being a layer having a low index of refraction, and a transparent conductive member disposed on said most removed layer.

5. A pickup tube comprising an envelope, means for producing an electron beam in one end of said envelope, a target electrode in the other end of said envelope, said target electrode including a transparent support member having a plurality of color filter strips arranged in clusters on the surface of said member toward said means, each of said clusters including a color filter which passes blue light and a color filter which passes green light, the color filters in each of said clusters comprising an even number of successive layers of alternate high and low index of refraction materials, and the layer of material nearest said means of said filters that pass both blue light and green light being a low index material, a different gold signal strip on each of said filters and between said means and said filters, and a photoconductor on said signal strips.

References Cited in the file of this patent

UNITED STATES PATENTS

| | | |
|---|---|---|
| 2,412,496 | Dimmick | Dec. 10, 1946 |
| 2,420,168 | Dimmick | May 6, 1947 |
| 2,676,117 | Colbert et al. | Apr. 20, 1954 |
| 2,700,323 | Schroder | Jan. 25, 1955 |
| 2,719,241 | Coltman | Sept. 27, 1955 |
| 2,742,819 | Koch et al. | Apr. 24, 1956 |
| 2,750,832 | Morgan | June 19, 1956 |
| 2,770,746 | Gray | Nov. 13, 1956 |
| 2,782,676 | Osterberg | Feb. 26, 1957 |